Figure 10:
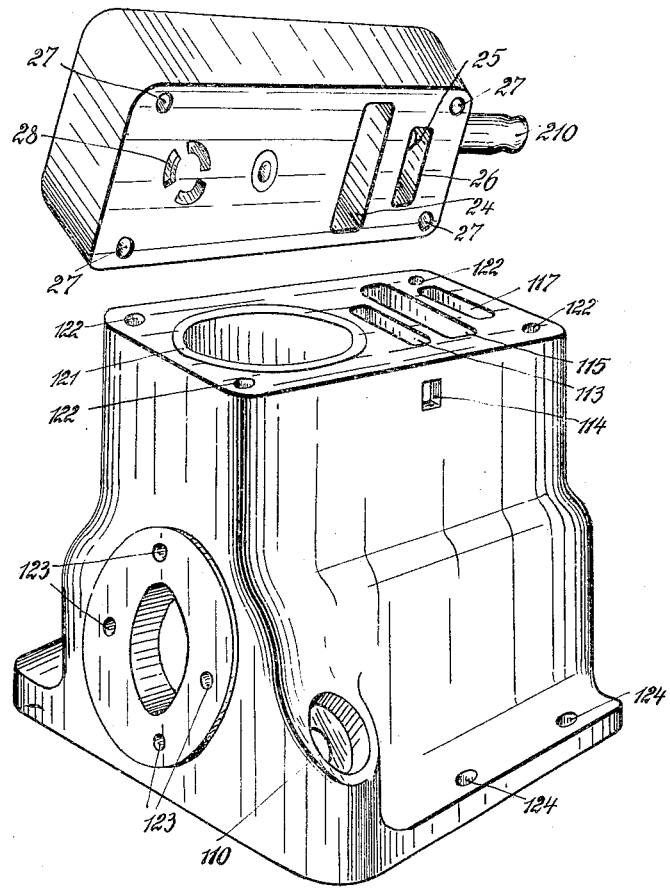

Nov. 17, 1931.   H. SILTEN   1,832,588
ELECTRICALLY OPERATED PISTON GAS PUMP UNIT
Filed Feb. 11, 1931   3 Sheets-Sheet 1
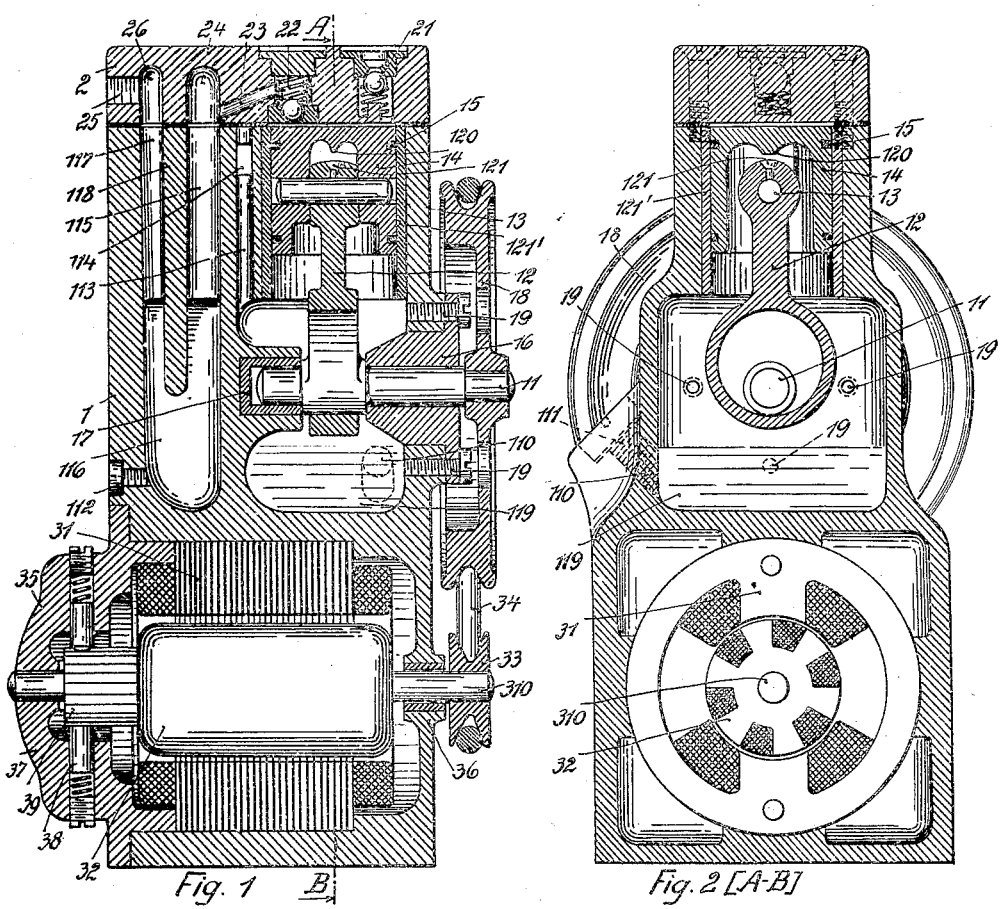
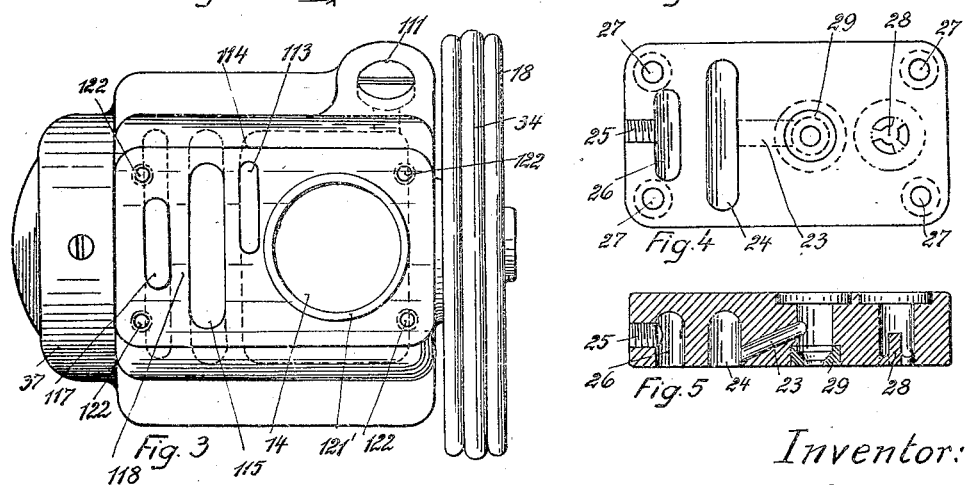
Inventor:
Heinz Silten,
by W. Gehrenbeck,
Attorney.

Nov. 17, 1931.  H. SILTEN  1,832,588
ELECTRICALLY OPERATED PISTON GAS PUMP UNIT
Filed Feb. 11, 1931   3 Sheets-Sheet 2
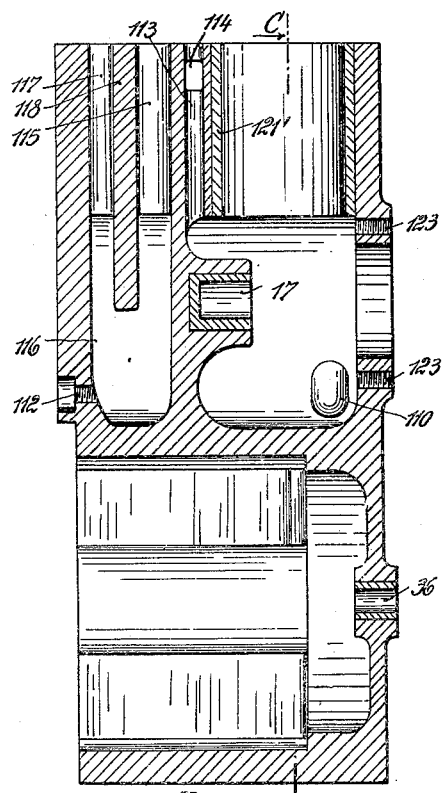
Fig. 6.
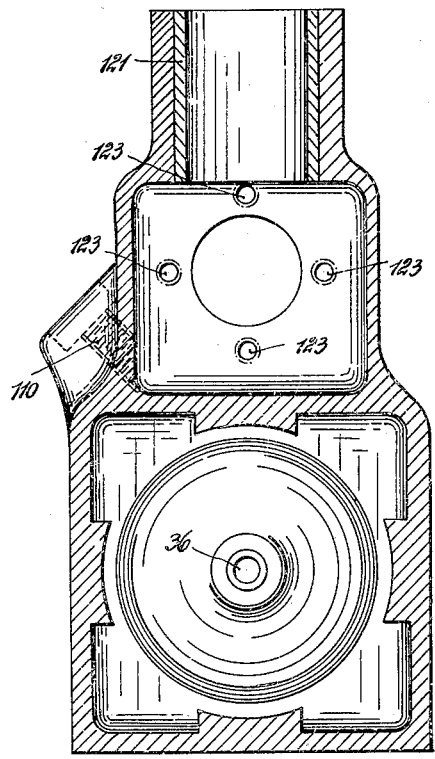
Fig. 7. [C-D]
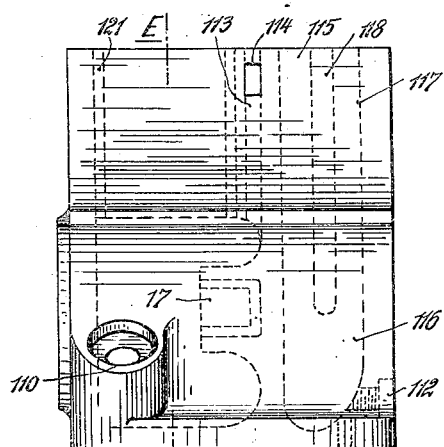
Fig. 8.
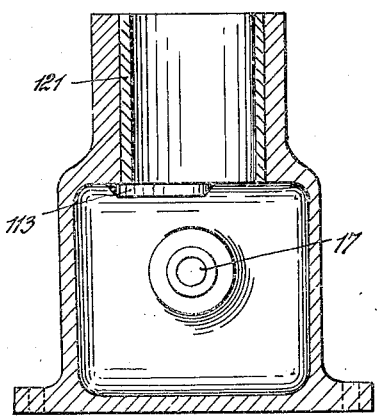
Fig. 9. [E-F]
Inventor:
Heinz Silten
by W. Schornborn
Attorney.

Nov. 17, 1931.  H. SILTEN  1,832,588
ELECTRICALLY OPERATED PISTON GAS PUMP UNIT
Filed Feb. 11, 1931    3 Sheets-Sheet 3

Inventor:
Heinz Silten.
by N. E. Schornborn
    Attorney.

Patented Nov. 17, 1931

1,832,588

UNITED STATES PATENT OFFICE

HEINZ SILTEN, OF BERLIN, GERMANY, ASSIGNOR TO SAUERSTOFF-CENTRALE FUR MEDIZINISCHE ZWECKE DR. ERNST SILTEN, OF BERLIN, GERMANY, A COMPANY OF GERMANY

ELECTRICALLY OPERATED PISTON GAS-PUMP UNIT

Application filed February 11, 1931. Serial No. 515,121.

My invention relates to the manufacture of electrically driven small-sized gas pumps of the piston type provided with centrifugal lubrication.

The invention consists in providing a single casting having only one cover to act as casing for the pump and the oil separator, and covers also modifications wherein the motor is arranged in the casing beside the pump and the oil separator. It is immaterial whether special bushes, valve seats, and the like are cast into the cylinder or on to the journal or journals of the pump and motor and for the valve seats or not.

One embodiment of the invention is illustrated by way of example in the accompanying drawings, in which Figure 1 is a section along the pump axis of an electrically operated small gas pump of the piston type with centrifugal lubrication, according to the invention; Fig. 2, a section on the line A—B, of Fig. 1; Fig. 3, a plan of Fig. 1 with the cover removed; Fig. 4, a view of the cover from the inside; Fig. 5, a sectional view of the cover; Fig. 6, a section of the casing for the piston pump, the oil separator and the motor; Fig. 7, a section on the line C—D, of Fig. 6, seen in the direction of the arrow; Fig. 8, a view of the casing for the piston pump and the oil separator; Fig. 9, a section on the line E—F, of Fig. 8, seen in the direction of the arrow; and Fig. 10, a diagram of the casing for the piston pump and the oil separator and of the cover.

Like numerals refer to like parts.

In the drawings, 1 is the casing, 2 the cover, 11 is the eccentric shaft of the pump, 12 the connecting rod, 13 the piston pin, 14 the piston, 15 are piston rings for packing the piston, 16 is the outer bearing of the eccentric shaft, 17 the inner bearing thereof, 18 the driving wheel of the pump, 19 are fastening screws for the outer bearing, 110 is a charging aperture for the lubricating oil disposed at a suitable distance under the bearings of the pump shaft, 111 a screw plug for the charging aperture, 112 a discharge screw for the oil separator, 113 a vertical duct leading from the crank space up to the surface of the casing 1 and being in communication with the atmosphere through the medium of the aperture 114. The duct 113 opens near the inner bearing 17 of the eccentric shaft 11. 115 is the duct of the oil separator in the casing 1 and leads from the surface of the casing 1 to the extension 116 of the oil separator, the extension 116 being dimensioned so as to serve also as air vessel. The discharge screw 112 serves for removing from time to time the refuse collecting in the extension 116. 117 is a duct leading out of the extension 116. The rib 118 separates the duct 115 from the duct 117.

Lubricating oil 119 is kept in the crank case. The piston 14 has a nose 120 disposed over the lubricating hole 121 of the connecting rod 12. A bush 121' is inserted in the bore of the cylinder to serve as bearing sleeve for the piston.

In the cover, the suction valve 21 and the pressure valve 22 are arranged. Apertures place the space of the suction valve 21 into communication with the outer air, and the space of the pressure valve 22 is connected by an opening with the pump space.

Below the oil space of the pump the casing 1 contains an opening for the magnetic field 31 and the armature 32 of the driving motor. The driving disc 33 is secured to the motor shaft 310, and the belt 34 passes over the disc 33 and the pulley 18 of the driving wheel of the pump. 35 and 36 are the bearings of the electric motor, 37 is the end shield bearing bracket, 38 are the brushes, and 39 is the collector. The cover 2 is provided on its inside with a plane surface of the same type as that of the casing 1. The duct 115 of the casing 1 extends into the recess 24 of the cover 2. A connecting channel 23 leads from the chamber of the pressure valve 22 in an oblique direction down to the recess 24. An opening 25 leads in the cover 2 from outside to the recess 26 which is the continuation of the outlet channel 117. The opening 25 may be connected with an air piping 210, as shown in Fig. 10, and a suction piping, not shown, may be connected to the cover 2 of the casing 1 so as to lead to the supply opening of the suction valve 21.

The threaded holes 122 in Fig. 3 serve for securing the cover in position, and the holes 27 in Fig. 4 hold the fastening screws of the cover 2. 28 in Figs. 4 and 5 is the seat for the springs of the suction valve 21. 29 is a seat ring cast into the cover 2 for the pressure valve 22.

During the manufacture of the casting for the casing 1 the openings 110 and 112 as well as the openings 123 for the fastening screws 19 of the bush 16 are recessed in addition to the openings stated. Subsequently, threads are cut into these openings. Furthermore, the holes 124 in Fig. 10 are provided to secure the pump to its support.

The small piston gas pump is operated by connecting the electric driving motor with a source of current so that it rotates and, by means of the driving disc 33, the belt 34 and the pulley 18, transmits its rotation to the eccentric shaft 11 of the pump, whereby the piston 14 is moved up and down. The connecting rod 12, at each rotation, dips once into the oil 119, picks up a drop of oil and throws it around inside the crank case. All parts of the crank case, including the insides of the bush 121' and of the piston 14, are thus covered with oil which also reaches the nose 120 of the piston 14 whence it drops into the lubricating hole 121 of the connecting rod 12 so that the piston pin 13 is oiled continually. At each rotation, owing to the descent of the piston 14, the space in the crank case below the piston 14 is reduced in size, the excess air being pushed out into the open through the vertical duct 113 and the aperture 114. On the ascent of the piston 14 fresh air is drawn in in the reversed manner, and, as the duct 113 opens near the inner bearing 17, this fresh, and therefore cool, air strikes the inner bearing 17 and cools it.

The pump further draws in air or another gas through the suction valve 21 and presses it out again from the cylinder space through the pressure valve 22. When gas is pressed out of the pressure valve 22 through the connecting duct 23 into the recess 24, it will strike the wall of the recess 24. As all parts of the pump are heavily oiled, owing to the regular supply of the lubricant, drops of oil will often be found in the gas. These drops of oil then settle on the wall of the recess 24 and are thus separated from the gas. The purified gas then passes through the duct 115 and the outlet channel 117 to the opening 25 whence it is conducted away through the piping 210 for use, and the oil remains in the separator wherein it drops down along the wall of the recess 24 and of the duct 115 to collect in the extension 116 which receives also all other liquid or solid matter separated from the gas when it strikes the wall of the recess 24. These substances can be removed from time to time after unscrewing the screw 112.

The pump may be used for pressing gas to any desired spot or removing it therefrom, according to whether this spot be connected behind the piping 210 or in front of the suction valve 21.

It is not necessary, though practical, to arrange the motor in the same casing as the other parts of the plant. If the motor is self-contained, its frame is preferably of rectangular shape, as shown in Fig. 2, so that the rest of the casing, as illustrated in Fig. 10, may be readily secured to the motor frame by means of screws. However, instead of below the pump shaft, the motor may be secured beside the pump casing.

The casting for the small piston gas pump consists preferably of silumine, an alloy, the chief ingredients of which are silicon and aluminum. This substance possesses sufficient strength and density and is very light in weight. As the electrically operated gas pump is to be rendered portable, lightness is a very desirable feature. Silumine is, however, not suited to serve as substance from which bearings for steel shafts could be made. For this reason, a number of bronze bushes, such as the bushes 121', 17 and 36, are provided in the casting 1 already during the casting process.

Parts of the valves 21 and 22 are cast into the casting 2 for other reasons.

The castings 1 and 2 are constructed so as to require machining only at a few spots. In the casting 1, only the upper and lower side, the inner wall of the bush 121', the bush 17, the surfaces hugged by the bush 16, and, in case the motor is built into the casting 1, the surfaces to which its parts are adjacent with its bearing 36 need be worked. In the casting 2, only the surface facing the casting 1 and the inside of the opening 25 must be worked. The illustrations, particularly Fig. 10, indicate that both castings 1 and 2 have smooth surfaces only and no inwardly directed corners which are difficult to clean. As the other surfaces of the pump are smooth, too, it is suited particularly for medical and hygienic purposes, such as the spraying of medicines and the like for inhaling, it being an easy matter to keep the entire pump plant in a perfectly sanitary condition.

I claim:—

1. An electrically operated small-sized piston gas pump unit comprising, in combination, a casing and a suitable cover, both of which jointly surround a piston pump having centrifugal lubrication, surrounded by the casing, and an oil separator.

2. An electrically operated small-sized piston gas pump unit according to claim 1 and a duct connecting the crank case with the atmosphere.

3. An electrically operated small-sized piston gas pump unit according to claim 1, an electric motor and a joint casing surrounding both the motor and the pump.

4. An electrically operated small-sized piston gas pump unit according to claim 1 and cast-in cylinder liner made of a substance differing from that of the metal casing.

5. An electrically operated small-sized piston gas pump unit according to claim 1 and cast-in bushing made of a substance differing from that of the metal of the casing.

6. An electrically operated small-sized piston gas pump unit according to claim 1 and two ducts in the casing and the cover, an extension in the casing connecting both ducts, and a connecting channel leading from the pressure valve to the first one of the two ducts, all ducts being cast in to the casing.

7. An electrically operated small-sized piston gas pump unit according to claim 1 and a nose on the piston in its inner hollow and a lubricating aperture in the connecting rod under the nose.

In testimony whereof I have affixed my signature.

HEINZ SILTEN.